US005472377A

United States Patent [19]
Andrews et al.

[11] Patent Number: 5,472,377
[45] Date of Patent: Dec. 5, 1995

[54] POULTRY PROCESSING METHOD, APPARATUS, AND PRODUCT

[75] Inventors: Stanley B. Andrews, Springdale; Bobby Z. Haley, Fayetteville, both of Ark.; Robert L. Sanford, Shelbyville, Tenn.; Mark H. Curry, Rogers; Donald M. Zimmerman, Springdale, both of Ark.

[73] Assignee: Tyson Holding Company, Wilmington, Del.

[21] Appl. No.: 374,071

[22] Filed: Jan. 19, 1995

[51] Int. Cl.$^6$ ................................................. A22C 21/00
[52] U.S. Cl. .......................... 452/149; 452/155; 452/167
[58] Field of Search ................................. 452/149, 130, 452/152, 155, 160, 167, 178

[56] References Cited

U.S. PATENT DOCUMENTS

| | | | |
|---|---|---|---|
| 3,514,809 | 6/1970 | Barbour et al. | 452/167 |
| 3,990,126 | 11/1976 | Ochylski | 452/167 |
| 4,558,489 | 12/1985 | van Mil | 452/149 |
| 4,593,435 | 6/1986 | Martin et al. | 17/52 |
| 4,815,168 | 3/1989 | van den Neuwelaar et al. | 452/149 |
| 5,035,673 | 7/1991 | Hazenbroek | 452/149 |
| 5,184,974 | 2/1993 | Cornelissen et al. | 452/155 |

Primary Examiner—Willis Little
Attorney, Agent, or Firm—Dougherty, Hessin, Beavers & Gilbert

[57] ABSTRACT

Provided are: (a) a poultry carcass processing method; (b) an apparatus which is ideally suited for use in practicing the inventive method; and (c) a poultry product provided by the inventive processing method. The inventive processing method comprises the steps of (a) pivoting a first poultry carcass section (e.g., a forward carcass section) with respect a second carcass section (e.g., a rearward carcass section) such that the outer side of the backbone structure included in the first section is rotated toward the outer side of the portion of the backbone structure included in the second section and (b) with the sections retained in pivoted relationship, pulling one of the sections directionally away from the other section such that a portion of the meat provided on the outer side of the forward portion of the backbone structure is detached therefrom and is retained in attached relationship to the rearward section of the carcass. The inventive apparatus comprises (a) a pulling structure for pulling the one carcass section directionally away from the other section and (b) a holding device for holding the sections in pivoted relationship while the pulling structure pulls the one section directionally away from the other section such that at least a portion of the meat provided on the outer side of the forward portion of the backbone structure is detached therefrom and is retained in attached relationship to the rearward section of the carcass.

28 Claims, 8 Drawing Sheets

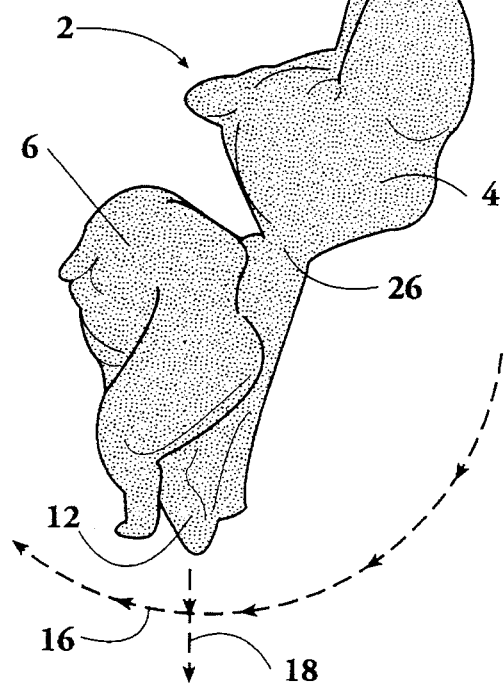
Fig. 2
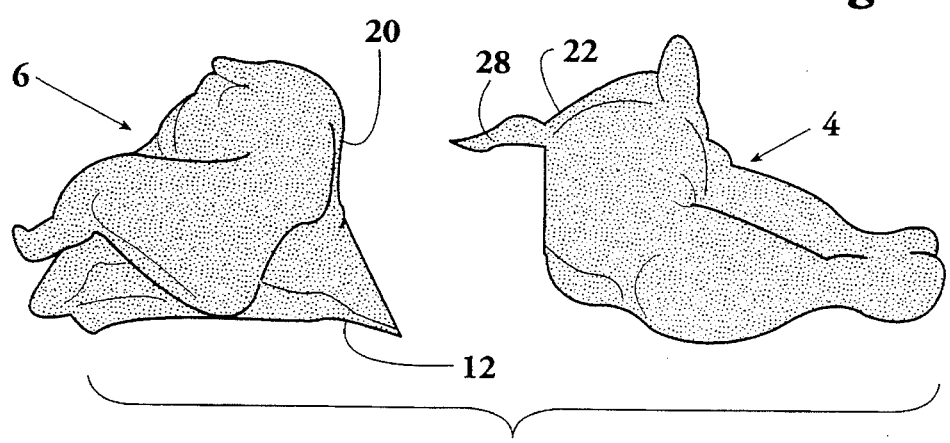
Fig. 1
Fig. 3

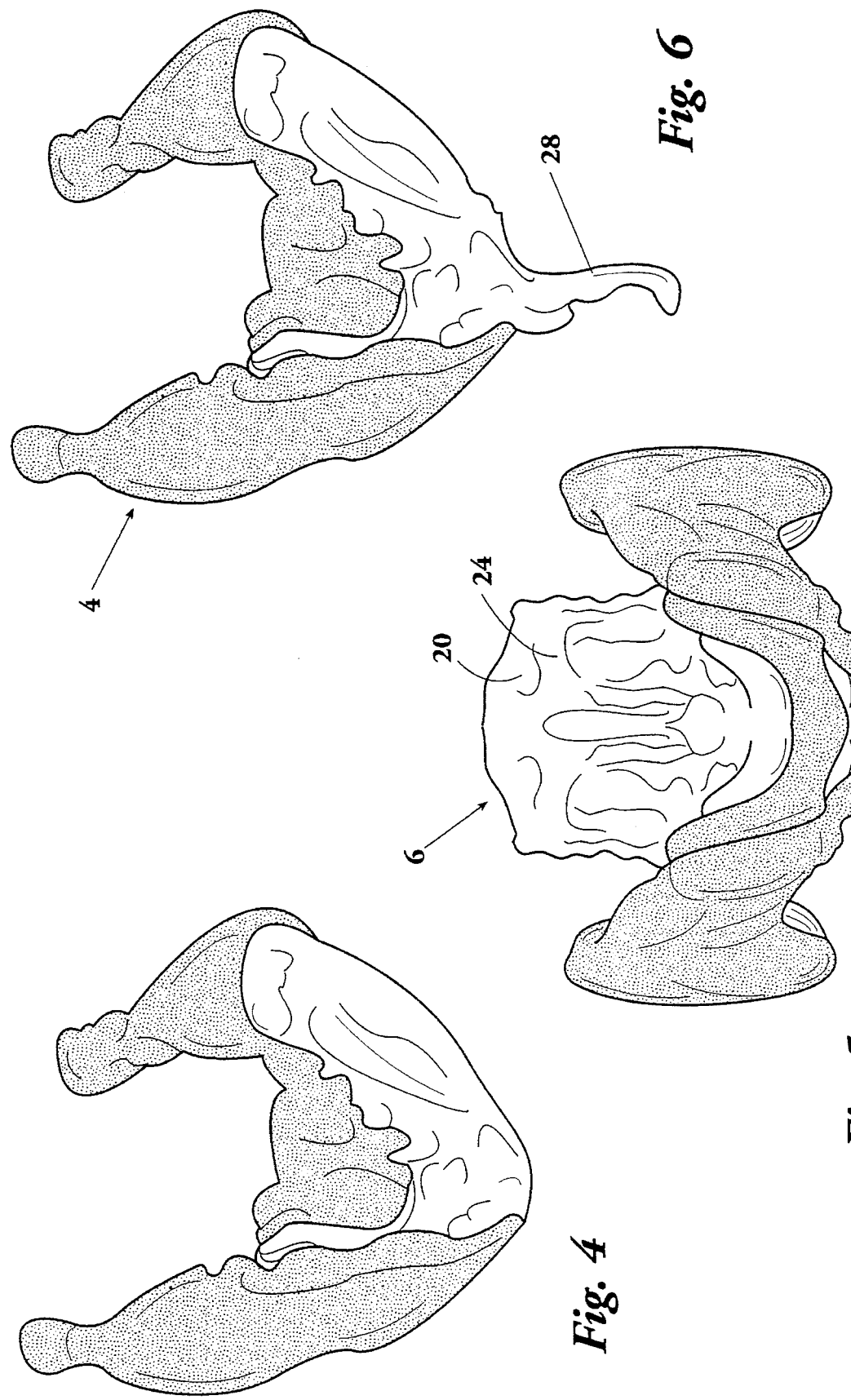

POULTRY PROCESSING METHOD, APPARATUS, AND PRODUCT

FIELD OF THE INVENTION

The present invention relates to apparatuses and methods for processing poultry carcasses. The present invention also relates to poultry products provided by such apparatuses and methods. More particularly, but not by way of limitation, the present invention relates to methods and apparatuses for halving poultry carcasses and to poultry products provided by such halving methods and apparatuses.

BACKGROUND OF THE INVENTION

U.S. Pat. No. 4,593,435 discloses an apparatus and method for halving poultry carcasses. Eviscerated poultry carcasses are conducted, in inverted position, through the apparatus of U.S. Pat. No. 4,593,435 by means of both a shackle conveyor and a screw-type conveyor. Within the apparatus, each carcass is first delivered to an inclined, rotating cog wheel having an array of teeth formed around the circumference thereof. The cog wheel also has a slot provided therein for receiving a stationary severing blade. The teeth of the cog wheel engage the evisceration vents provided in the poultry carcasses and hold the carcasses in tensioned position such that the stationary blade engages each carcass at the base of the keel and cuts the connecting tissue webs disposed between the breast and thigh portions of the carcass. Following the cutting operation, each carcass is delivered to an inclined, counter-rotating conical auger which engages the enlarged opening formed by the cutting operation and effects a downward bending movement of the forward carcass section about a longitudinal guide rod. This bending operation breaks the carcass backbone into two, separate pieces such that the forward section of the carcass hangs loosely from the rearward carcass section by means of only a ribbon of back skin and meat which remains attached to both the forward and rearward backbone sections.

The entire disclosure of U.S. Pat. No. 4,593,435 is incorporated herein by reference.

As will be understood by those skilled in the art, other apparatuses (e.g., rotating blade apparatuses) have also been used for producing processed poultry carcasses of the type provided by the apparatus and method of U.S. Pat. No. 4,593,435. Alternatively, such processed poultry carcasses can be individually produced by hand.

Heretofore, the forward and rearward sections of a "halved" poultry carcass of the type provided by the apparatus and method of U.S. Pat. No. 4,593,435 have been separated from each other by simply cutting the ribbon of back skin and meat which extends between the separated backbone sections. The resulting forward carcass section will typically include the keel, the breasts, the wings, and the upper portion of the back. The rearward carcass section will typically include the legs, the thighs, and the lower portion of the back.

Following separation, the forward and rearward carcass sections can be processed, as desired, in separate removal and sectioning operations to produce wings, breasts, thighs, and the like. The rearward carcass section will also commonly be sold in one piece without further removal and sectioning.

Unfortunately, when poultry carcasses are halved and separated in the manner described above, the meat attached to the middle of the forward backbone section typically is not recovered in a desirable manner. Commonly, after the forward section of the poultry carcass is subjected to further sectioning operations, the meat attached to the center of the forward backbone section will simply be rendered along with other by-products of the sectioning process.

SUMMARY OF THE INVENTION

The present invention provides a poultry processing method wherein a substantial part of the meat provided on the forward portion of the backbone structure is removed therefrom and is desirably retained in attached relationship to the rearward section of the carcass. The present invention also provides a poultry product produced by the inventive processing method. Further, the present invention provides an apparatus which is ideally suited for continuously and automatically performing the inventive processing method.

Each poultry carcass processed in accordance with the present invention will preferably comprise: a backbone structure having an outer side; skin tissue and meat attached to the outer side of the backbone structure; a forward carcass section including a forward portion of the backbone structure; and a rearward carcass section including a rearward portion of the backbone structure, wherein the forward carcass section is retained in attached relationship with the rearward section by at least said skin tissue. The poultry carcasses processed in accordance with the present invention will most preferably be carcasses of the type provided by the method and apparatus of U.S. Pat. No. 4,593,435.

The inventive poultry processing method preferably comprises the steps of: (a) pivoting a first of said forward and rearward carcass sections with respect to a second of said carcass sections such that the outer side of the portion of the backbone structure included in the first section is rotated toward the outer side of the portion of the backbone structure included in the second section and (b) with the carcass sections retained in the pivoted position provided in step (a), pulling one of the carcass sections directionally away from the other section such that at least a portion of the meat provided on the outer side of the forward portion of the backbone structure is detached from the forward portion of the backbone structure and is retained in attached relationship to the rearward section of the carcass.

The inventive poultry processing apparatus preferably comprises: (a) pulling means for pulling one of said forward and rearward carcass sections directionally away from the other of said sections and (b) holding means for holding the carcass sections in a pivoted relationship while the pulling means pulls one of the sections directionally away from the other of the sections such that at least a portion of the meat provided on the outer side of the forward portion of the backbone structure is detached from the forward portion of the backbone structure and is retained in attached relationship to the rearward carcass section.

The inventive apparatus also preferably includes a pivoting means for placing the carcass sections in the above-mentioned pivoted relationship. The pivoting means is preferably operable for pivoting a first of the sections with respect to a second of the sections such that the outer side of the portion of the backbone structure included in the first section is rotated toward the outer side of the portion of the backbone structure included in the second section.

By removing back meat from the forward section of the backbone structure while retaining the removed back meat in attached relationship to the rearward carcass section, the present invention operates to substantially upgrade the value of said removed meat. Further, when back meat is removed from the forward backbone section using the inventive processing method, the characteristics of the forward carcass section are desirably changed such that the breast portions of the forward section can be more readily deboned without aging.

Further objects, features, and advantages of the present invention will be apparent to those skilled in the art upon reference to the accompanying drawings and upon reading the following description of the preferred embodiments.

BRIEF DESCRIPTION OF THE DRAWINGS

FIG. 1 provides front view of a poultry carcass 2 immediately prior to processing in accordance with the present invention.

FIG. 2 provides a side view of carcass 2 as carcass 2 is processed in accordance with the present invention.

FIG. 3 depicts forward and rearward poultry carcass product sections 6, 4 provided by the inventive processing method.

FIG. 4 depicts a typical rearward carcass section provided by prior art processing techniques.

FIG. 5 depicts a forward carcass product section 6 provided by the present invention.

FIG. 6 depicts a rearward carcass product section 4 provided by the present invention.

DESCRIPTION OF THE PREFERRED EMBODIMENTS

Figure 7:
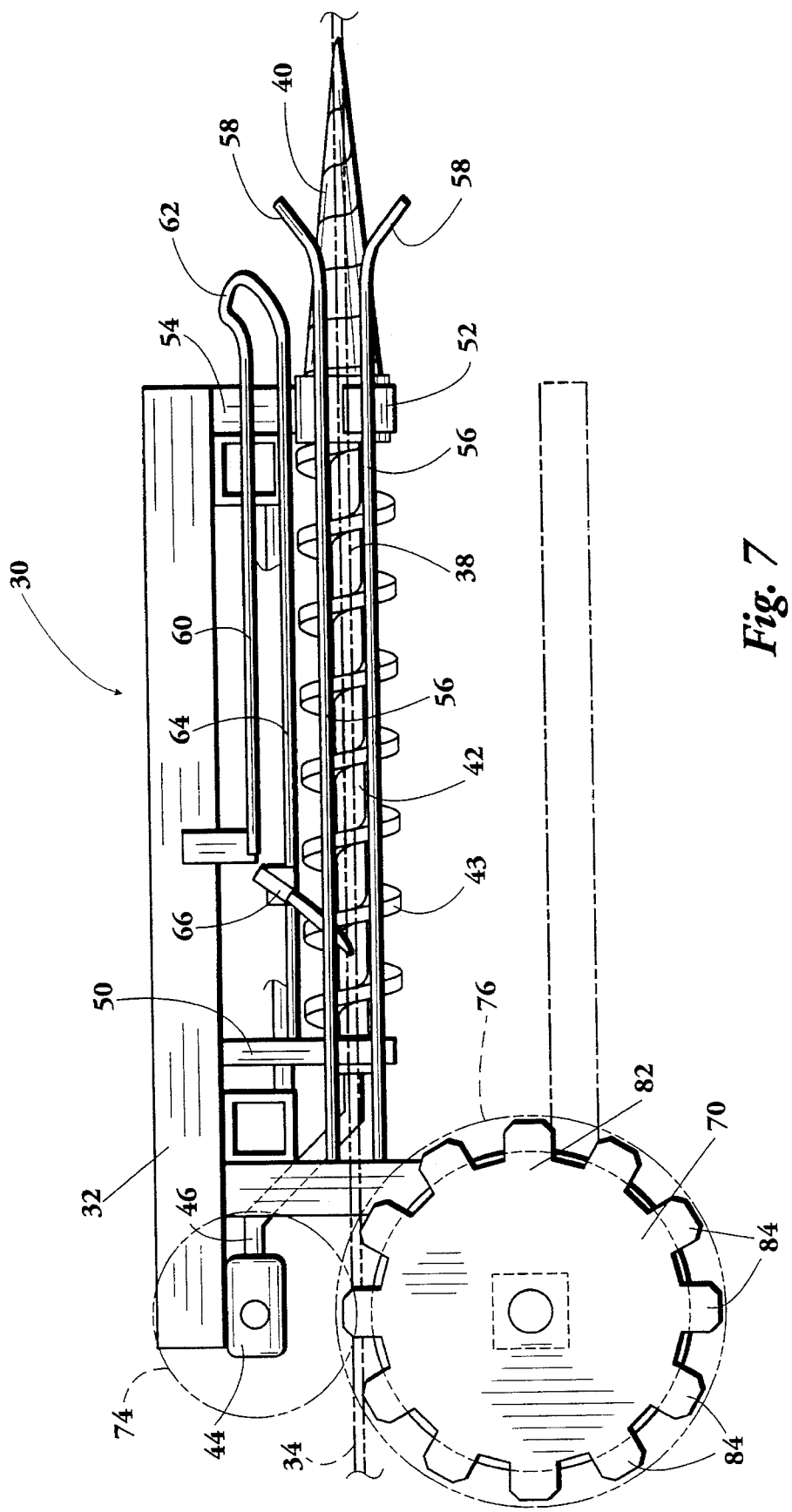
FIG. 7 provides a plan view of an embodiment 30 of the inventive poultry processing apparatus.
Figure 8:
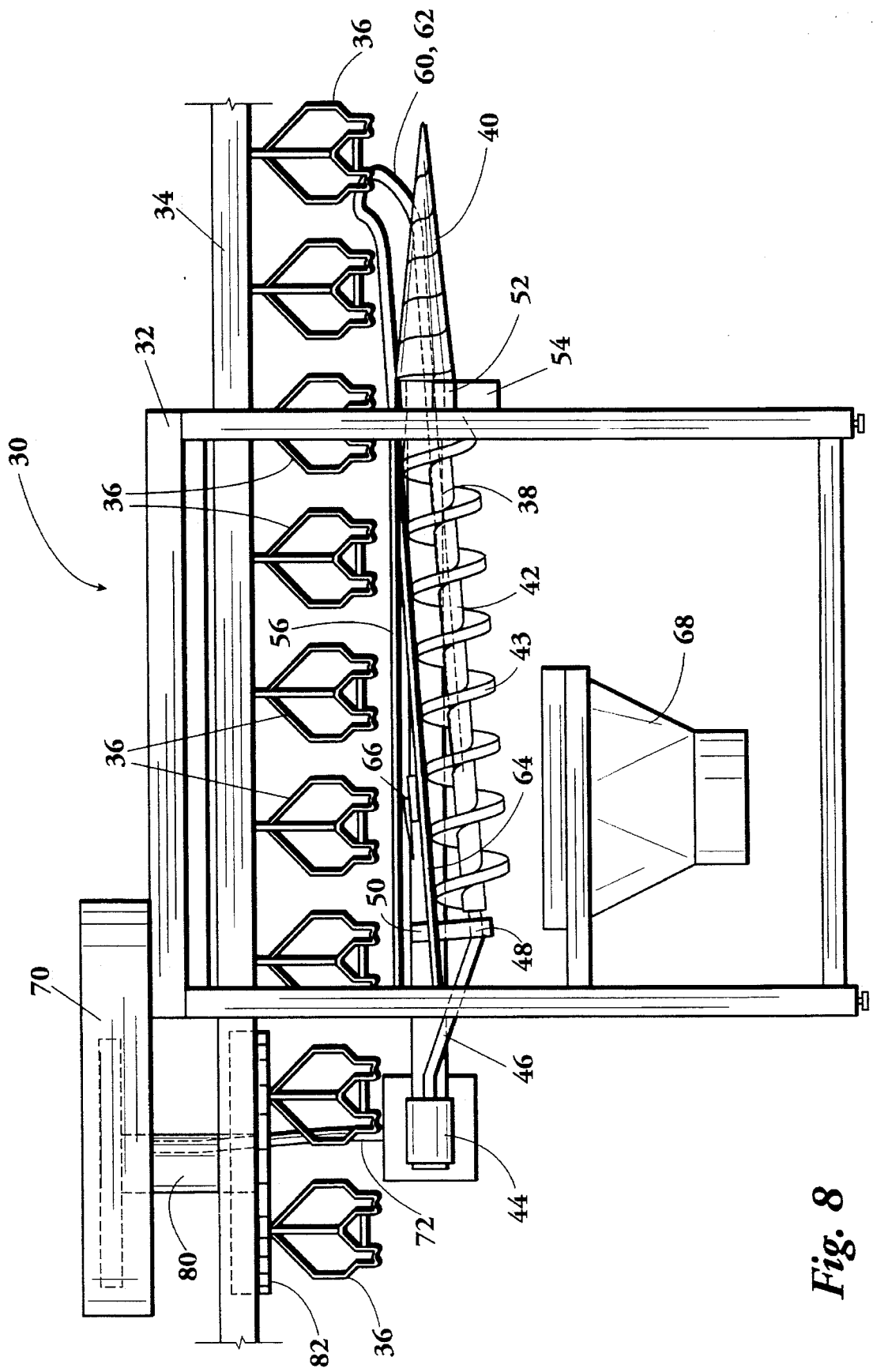
FIG. 8 provides an elevational front view of inventive apparatus 30.
Figure 9:
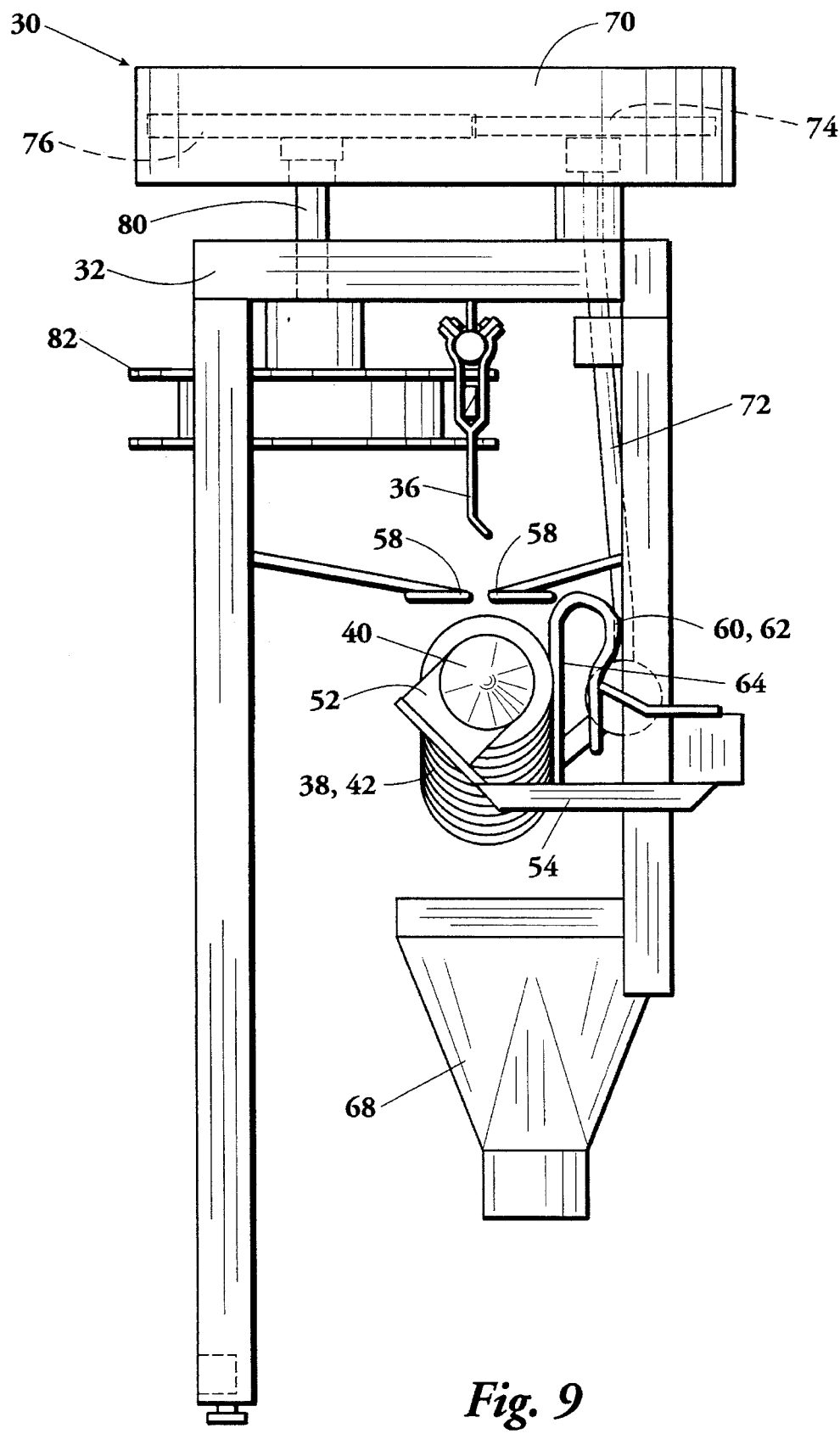
FIG. 9 provides an elevational side view of inventive apparatus 30.
Figure 10:
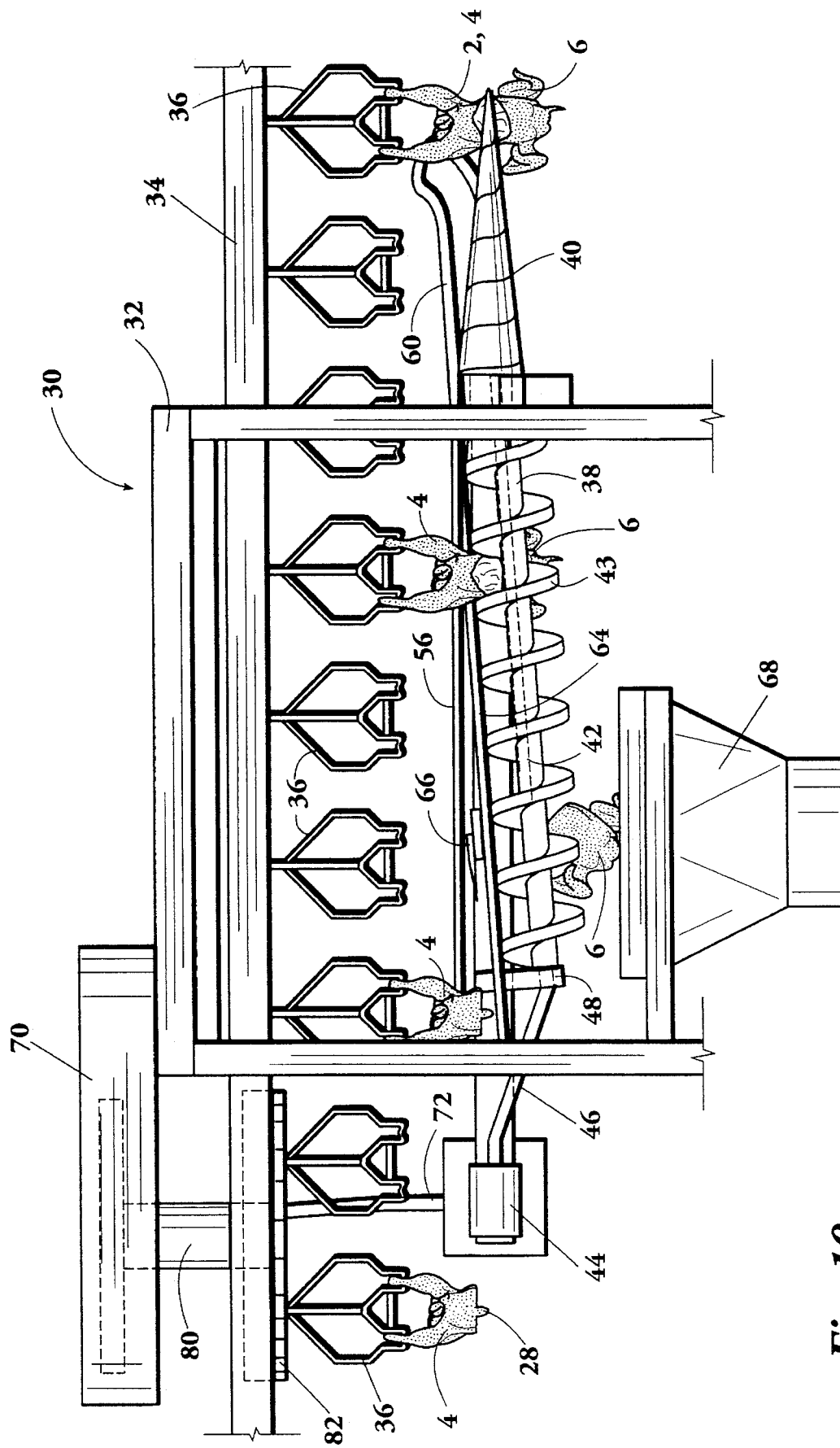
FIG. 10 provides a front view of inventive apparatus 30 wherein the inventive apparatus is being used for processing poultry carcasses 2 in accordance with the inventive method.

A poultry carcass 2 of the type preferred for processing in accordance with the inventive method is depicted in FIGS. 1 and 2. Poultry carcass 2 is most preferably a "halved" carcass of the type provided by the apparatus and method of U.S. Pat. No. 4,593,435. Carcass 2 comprises a rearward section 4 which includes the legs 8, the thighs 10, and a rearward portion 22 of the backbone structure. Poultry carcass 2 also comprises a forward section 6 which includes the keel 12, the wings 14, and a forward portion 20 of the backbone structure. As discussed hereinabove regarding the method of U.S. Pat. No. 4,593,435, the backbone structure of carcass 2 has preferably been broken or otherwise split such that (a) the forward portion 20 of the backbone structure has been separated from the rearward portion 22 of the backbone structure and (b) forward carcass section 6 preferably remains attached to rearward carcass section 4 only by means of a ribbon 26 of skin tissue and meat which is attached to both the outside surface of rearward backbone portion 22 and the outside surface 24 of forward backbone portion 20.

Although poultry carcass 2 is preferably a carcass of the type wherein forward backbone portion 20 has been completely separated from rearward backbone portion 22, it will be understood that carcass 2 can also be a carcass of the type wherein forward backbone portion 20 has been, at most, only partially separated from rearward backbone portion 22. If the forward and rearward backbone portions have not yet been completely separated, such separation can be accomplished during the first step (i.e., the pivoting step) of the inventive method.

Poultry carcass 2 can generally be a carcass produced from any type of eviscerated fowl. Examples of preferred types of fowl carcasses include chickens, turkeys, ducks, geese, and guineas. Poultry carcass 2 is most preferably a chicken carcass.

A basic embodiment of the inventive method is depicted in FIG. 2. In the embodiment shown in FIG. 2, rearward carcass section 4 is held in a substantially stationary, inverted position while forward carcass section 6 is pivoted, as shown at 16, such that the outer side 24 of forward backbone portion 20 is rotated toward the outer side of rearward backbone portion 22. With forward carcass section 6 substantially retained in the pivoted position depicted in FIG. 2, forward section 6 is then pulled directionally away from rearward section 4 as indicated at 18. As pivoted forward section 6 is pulled directionally away from rear section 4, a ribbon of meat 28 is torn (i.e., detached) from the center of the outside surface 24 of forward backbone portion 20. The meat ribbon 28 remains attached to the forward end of rearward backbone portion 22 and is therefore recovered as a part of rearward carcass section 4.

Although the basic embodiment of the inventive method has been described as including the step of pivoting forward section 6 with respect to rearward section 4, it will be understood that the general pivoted relationship of sections 6 and 4 can be established by pivoting either or both of sections 6 and 4. Further, although the basic embodiment of the inventive method has been described as including the step of pulling forward section 6 directionally away from rearward section 4, it will be understood that the same result can be obtained, for example, by holding forward section 6 stationary and pulling rearward section 4 in a direction generally opposite direction 18 or by pulling forward section 6 in direction 18 while simultaneously pulling rearward section 4 in said opposite direction.

The inventive processing method can be performed by hand or by automated means. Most preferably, the inventive method will be performed using an inventive apparatus of the type described hereinbelow.

A rearward carcass section 4 produced in accordance with the inventive method is depicted in FIG. 6. For comparison purposes, a rearward carcass section provided by a typical prior art separating technique is depicted in FIG. 4. Heretofore, the ribbon 26 of skin tissue and meat connecting rearward section 4 and forward section 6 has simply been cut across the forward end of rearward backbone section 22 such that substantially all of the meat provided on the exterior 24 of forward backbone portion 22 has been retained on forward backbone portion 22. However, when the inventive method is employed, meat ribbon 28 is detached from the exterior 24 of forward backbone portion 20 such that meat ribbon 28 remains attached to, and extends from, the forward end of rearward backbone portion 22.

An embodiment 30 of the processing apparatus provided by the present invention is depicted in FIGS. 7 through 11. Inventive apparatus 30 preferably comprises: a frame structure 32; a shackle conveyor 34 including shackles 36; a rotating conveyor assembly 38; parallel, horizontal upper guide rods 56 secured to frame 32; a lower guide structure 60 secured to frame 32; a product receiving bin 68 secured to frame 32; and a shackle conveyor drive assembly 70. Upper guide rods 56 are positioned substantially directly beneath the path of shackles 36. Further, upper guide rods 56 include outwardly directed ends 58 such that, as the shackle conveyor delivers carcasses 2 to inventive apparatus 30, the legs 8 of carcasses 2 are received between guide rods 56.

Rotating conveyor assembly 38 preferably comprises a rotating auger assembly which includes (a) a screw-type conveyor portion 42 having an elongate, cylindrical, central structure and a spiral channel structure 43 wrapped around and projecting from the cylindrical central structure and (b) a conical auger portion 40 projecting from the forward end of screw-type conveyor portion 42. The auger assembly is preferably inclined such that the distal end of conical auger portion 40 is elevated with respect to the rearward end of screw-type conveyor portion 42. Rotating conveyor assembly 38 also preferably comprises: a motor 44 secured to frame 32; a drive linkage 46 operably extending from motor 44 to the rearward end of screw-type conveyor portion 42; a rear bearing 48 wherein the rearward end of the auger assembly is rotatably received; a rear bearing support 50 extending from frame 32; a forward bearing 52 which rotatably holds the auger assembly at the base of forward conical portion 40; and a forward bearing support structure 54 which extends from frame 32.

Lower guide structure 60 is secured to frame 32 and comprises a curved forward end 62 and an inclined retaining/pulling rod portion 64. As depicted in FIGS. 7–10, inclined rod portion 64 is positioned adjacent to screw-type conveyor 42 and is preferably inclined at substantially the same angle as screw-type conveyor 42. The curved end 62 of lower guide structure 60 is preferably configured and positioned as depicted in FIGS. 7–10 so that, as shackle conveyor 34 delivers poultry carcasses 2 to inventive apparatus 30, the engagement of conical auger 40 with carcasses 2 will cause the hanging, forward sections 6 of said carcasses to pivot around the bottom of inclined rod 64. Lower guide structure 60 also preferably includes a knife 66 attached to the top of inclined rod 64 near the rearward end of rod 64.

Shackle conveyor drive assembly 70 is preferably operable for moving shackle conveyor 34 in synchronization with rotating conveyor assembly 38. Shackle drive assembly 70 preferably comprises: a conveyor drive wheel 82; a first gear 74; a second 76 operably intermeshed with gear 74; a drive shaft linkage 72 operably extending from motor 44 to first gear 74; and a drive shaft 80 extending from second gear 76 to conveyor drive wheel 82. As will be understood by those skilled in the art, gears 74 and 76 can alternatively be replaced by a belt drive assembly or by generally any other type of drive assembly commonly used in the art.

Figure 11:
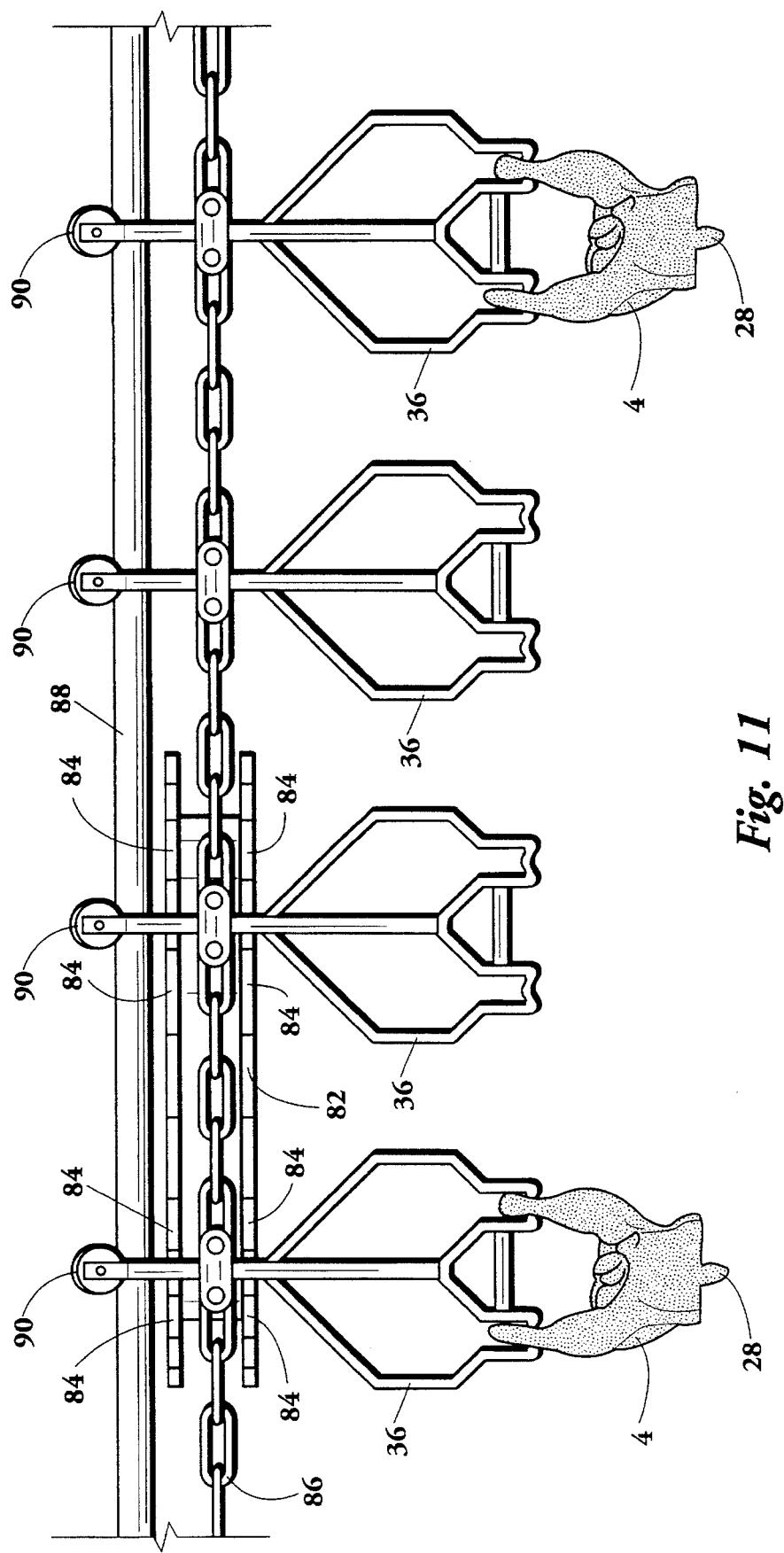
FIG. 11 depicts a portion of a shackle conveyor system used in inventive apparatus 30.
Figure 15:
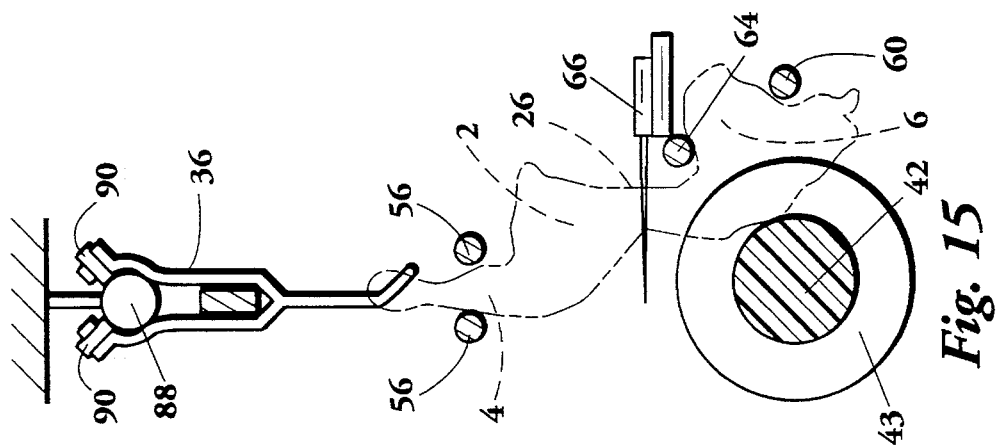
FIGS. 12, 13, 14, and 15 provide progressive views of the processing of a poultry carcass 2 in inventive apparatus 30.
Figure 14:
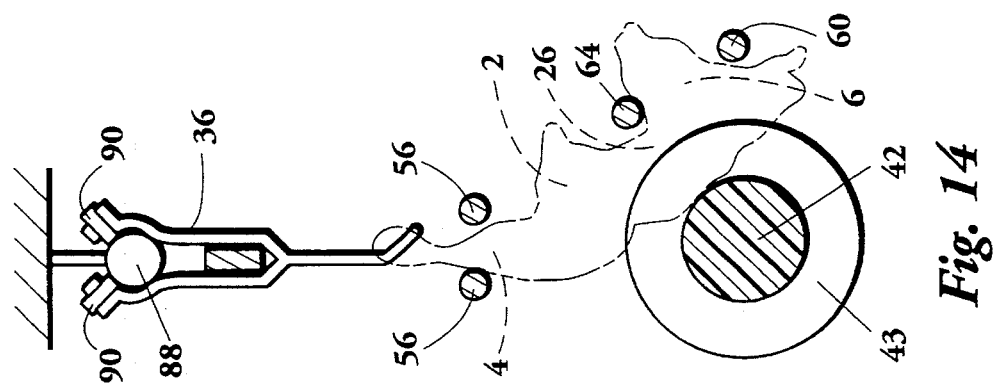
Figure 13:
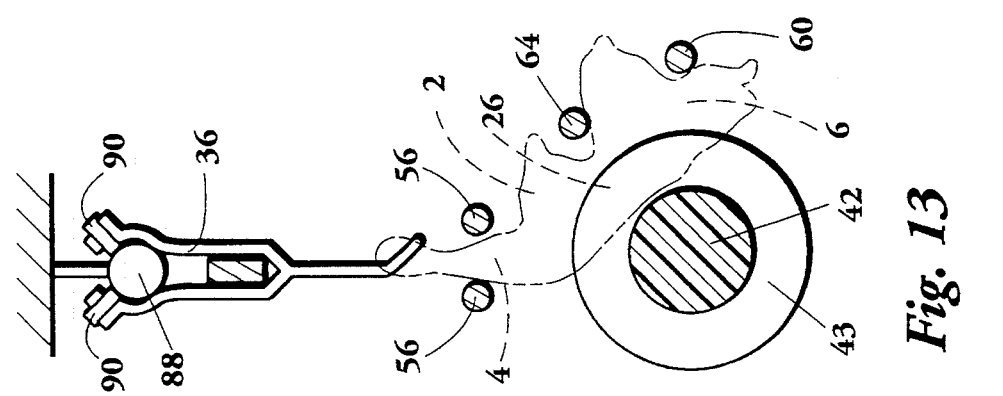
Figure 12:
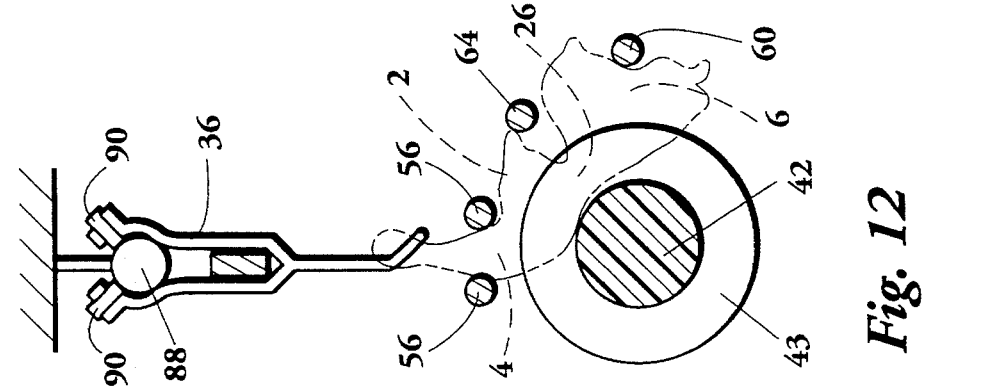

As shown in FIG. 11, each of shackles 36 preferably includes a pair of wheels 90 rotatably provided on the upper end thereof which ride on a horizontal guide rod 88. Additionally, shackle conveyor 34 preferably includes a conveyor chain 86 which links shackles 36. Conveyor drive wheel 82 preferably comprises an upper plate and a matching lower plate, each of said plates having a plurality of teeth 84 formed around the circumference thereof. Drive wheel 82 is preferably sized and configured such that, as drive wheel 82 operably engages shackle conveyor 34, conveyor chain 86 is received between the upper and lower plates of drive wheel 82 and the upper end portions of shackles 36 are drivingly received in the gaps provided between teeth 84.

The operation of inventive apparatus 30 in accordance with the inventive poultry processing method is depicted in FIGS. 10–15. Shackles 36 conduct carcasses 2 through inventive apparatus 30 in inverted position such that the legs 8 of carcasses 2 are received between upper guide rods 56. As each carcass 2 is delivered to inventive apparatus 30, the pointed, distal end of conical auger 40 is received between the forward (i.e., lower) section 6 and the rearward (i.e., upper) section 4 of the carcass. The inclined auger assembly rotates in a clockwise direction (as view from the perspective shown in FIG. 9) in synchronization with shackle conveyor 34 such that (a) conical auger 40 operates to pivot the hanging forward sections 6 of carcasses 2 around the bottom of inclined pulling rod 64, (b) forward carcass sections 6 are received within the spiral channel structure 43 of screw-type conveyor portion 42 and (c) screw-type conveyor portion 42 holds forward carcass sections 6 in pivoted position around inclined pulling rod 64 as carcasses 2 travel from the forward end toward the rearward end of inventive apparatus 30.

FIGS. 12–15 provide progressive views of a poultry carcass 2 being conveyed through inventive apparatus 30. As seen in FIGS. 12–15, screw-type conveyor 42 holds the forward section 6 of the carcass in a substantially fixed, pivoted position around the bottom of pulling rod 64 as the carcass is conveyed through the inventive apparatus. As also shown in FIGS. 12–15, the distance between inclined pulling rod 64 and upper guide rods 56, as viewed when traveling from the forward end to the rearward end of the apparatus, steadily increases. Thus, as carcass 2 travels through inventive apparatus 30, forward section 6 is pulled directionally away from rearward section 4 such that the meat provided in the center of the exterior side 24 of the forward backbone portion 20 is peeled off of forward backbone portion 20 and is retained in attached relationship to the forward end of rearward backbone portion 22.

Knife 66 is preferably attached in fixed position to the upper side of inclined pulling rod 64 at a location corresponding to the point of travel at which the ribbon 26 of skin and meat connecting forward carcass section 6 to rearward section 4 has been almost completely peeled from forward backbone portion 20 and is about to break. Knife 66 contacts and cuts the peeled skin and meat material so that a uniformly sized meat ribbon 28 is retained on the rearward section 4 of the inventive product. Product receiving bin 68 is preferably positioned beneath knife 66 such that, after the cutting operation, the forward sections 6 of carcasses 2 fall into bin 68.

Thus, the present invention is well adapted to carry out the objectives and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A method of processing a poultry carcass, said poultry carcass comprising a backbone structure having an outer side and having skin tissue and meat on said outer side and said poultry carcass further comprising a forward section including a forward portion of said backbone structure and a rearward section including a rearward portion of said backbone structure, wherein said forward section is retained in attached relationship with said rearward section by at least said skin tissue, said method comprising the steps of:

(a) pivoting a first of said sections with respect to a second of said sections such that the outer side of the portion of said backbone structure included in said first section is rotated toward the outer side of the portion of said backbone structure included in said second section and (b) with said first section retained in a pivoted position with respect to said second section as provided in step (a), pulling one of said sections directionally away from the other of said sections such that at least a portion of said meat on the outer side of said forward portion of said backbone structure is detached from said forward portion of said backbone structure and is retained in attached relationship to said rearward section.

2. The method of claim 1 wherein, prior to step (a), said forward portion of said backbone structure has been at least substantially separated from said rearward portion of said backbone structure but said skin tissue retains said forward section in attached relationship with said rearward section.

3. The method of claim 2 wherein, prior to step (a), said forward portion of said backbone structure has been at least substantially separated from said rearward portion of said backbone structure by breaking said backbone structure.

4. The method of claim 1 wherein said first section and said one section are said forward section and said second section and said other section are said rearward section.

5. The method of claim 4 wherein:

during steps (a) and (b) said rearward section is held in inverted position and said forward section is pulled downward with respect to said rearward section in step (b).

6. The method of claim 5 wherein, in step (a), a cone auger places said forward section in said pivoted position with respect to said rearward section by pivoting said forward section around an elongate pulling member.

7. The method of claim 6 wherein:

said elongate pulling member is an inclined member;

during step (b), a screw-type conveyor holds said forward section in said pivoted position around said inclined elongate pulling member; and said screw-type conveyor moves said forward section along said inclined elongate pulling member in step (b) such that, in accordance with step (b), said forward section is pulled directionally away from said rearward section and said portion of said meat is detached from said forward portion of said backbone structure.

8. The method of claim 1 further comprising the step, following step (b), of cutting said portion of said meat such that at least a part of said portion of said meat is separated from said forward section and is retained in attached relationship to said rearward section.

9. An apparatus for processing poultry carcasses wherein each of said poultry carcasses comprises a backbone structure having an outer side and having skin tissue and meat on said outer side and each of said poultry carcasses further comprises a forward section including a forward portion of said backbone structure and a rearward section including a rearward portion of said backbone structure, said forward section being retained in attached relationship with said rearward section by at least said skin tissue, said apparatus comprising:

pulling means for pulling one of said sections directionally away from the other of said sections and holding means for holding said sections in a pivoted relationship while said pulling means pulls said one section directionally away from said other section such that at least a portion of said meat on the outer side of said forward portion of said backbone structure is detached from said forward portion of said backbone structure and is retained in attached relationship to said rearward section.

10. The apparatus of claim 9 further comprising a pivoting means for placing said sections in said pivoted position by pivoting a first of said sections with respect to a second of said sections such that the outer side of the portion of said backbone structure included in said first section is rotated toward the outer side of the portion of said backbone structure included in said second section.

11. The apparatus of claim 10 wherein said pivoting means comprises a cone auger.

12. The apparatus of claim 10 wherein said one section and said first section are said forward section and said other section and said second section are said rearward section.

13. The apparatus of claim 9 wherein:

said pulling means comprises an inclined elongate member and said pivoted relationship comprises said one section placed in a rotated position around said inclined elongate member.

14. The apparatus of claim 13 wherein said holding means comprises a screw-type conveyor which holds said one section in said rotated position around said inclined elongate member.

15. The apparatus of claim 14 wherein said one section is said forward section and said other section is said rearward section.

16. The apparatus of claim 14 wherein said screw-type conveyor is inclined.

17. The apparatus of claim 16 wherein:

said inclined elongate member has an angle of inclination;

said screw-type conveyor has an angle of inclination; and said angle of inclination of said screw-type conveyor is substantially the same as said angle of inclination of said elongate member.

18. The apparatus of claim 9 further comprising conveying means for conveying said poultry carcasses through said apparatus.

19. The apparatus of claim 18 wherein said conveying means comprises a shackle conveyor.

20. The apparatus of claim 18 wherein:

said conveying means conveys said rearward sections of said poultry carcasses through said apparatus in inverted position;

said one section is said forward section;

said other section is said rearward section; and said pulling means is operable for pulling said forward section directionally downward.

21. A poultry product produced from a poultry carcass wherein, prior to producing said poultry product therefrom, said poultry carcass comprises a backbone structure having an outer side and having skin tissue and meat on said outer side and said poultry carcass further comprises a forward section including a forward portion of said backbone structure and a rearward section including a rearward portion of said backbone structure, said forward section being retained in attached relationship with said rearward section by at least said skin tissue, said poultry product having been produced by a method comprising the steps of:

(a) pivoting a first of said sections with respect to a second of said sections such that the outer side of the portion of said backbone structure included in said first section is rotated toward the outer side of the portion of said backbone structure included in said second section and (b) with said first section retained in a pivoted position with respect to said second section as provided in step (a), pulling one of said sections directionally away from the other of said sections such that at least a portion of said meat on the outer side of said forward portion of said backbone structure is detached from said forward portion of said backbone structure and is retained in attached relationship to said rearward section.

22. The poultry product of claim 21 wherein, prior to step (a), said forward portion of said backbone structure has been at least substantially separated from said rearward portion of said backbone structure but said skin tissue retains said forward section in attached relationship with said rearward section.

23. The poultry product of claim 22 wherein, prior to step (a), said forward portion of said backbone structure has been at least substantially separated from said rearward portion of said backbone structure by breaking said backbone structure.

24. The poultry product of claim 21 wherein said first section and said one section are said forward section and said second section and said other section are said rearward section.

25. The poultry product of claim 24 wherein:

during steps (a) and (b) said rearward section is held in inverted position and said forward section is pulled downward with respect to said rearward section in step (b).

26. The poultry product of claim 25 wherein, in step (a), a cone auger places said forward section in a pivoted position with respect to said rearward section by pivoting said forward section around an elongate pulling member.

27. The poultry product of claim 26 wherein:

said elongate pulling member is an inclined member; during step (b), a screw-type conveyor holds said forward section in said pivoted position around said inclined elongate pulling member; and said screw-type conveyor moves said forward section along said inclined elongate pulling member in step (b) such that, in accordance with step (b), said forward section is pulled directionally away from said rearward section and said portion of said meat is detached from said forward portion of said backbone structure.

28. The poultry product of claim 21 wherein said method further comprises the step, following step (b), of cutting said portion of said meat such that at least a part of said portion of said meat is separated from said forward section and is retained in attached relationship to said rearward section.

* * * * *